United States Patent
Johnson et al.

(10) Patent No.: US 6,817,769 B2
(45) Date of Patent: Nov. 16, 2004

(54) ROLLER BEARING HAVING HIGH PERFORMANCE BEARING SEAL AND CARTRIDGE

(75) Inventors: James P. Johnson, St. Charles, IL (US); David Dubovik, Lisle, IL (US); Adam M. Theros, Plainfield, IL (US)

(73) Assignee: Emerson Power Transmission Manufacturing, L.P., Maysville, KY (US)

( * ) Notice: Subject to any disclaimer, the term of this patent is extended or adjusted under 35 U.S.C. 154(b) by 151 days.

(21) Appl. No.: 10/260,631

(22) Filed: Sep. 30, 2002

(65) Prior Publication Data

US 2004/0062461 A1 Apr. 1, 2004

(51) Int. Cl.⁷ ............................................. F16C 33/78
(52) U.S. Cl. ....................... 384/478; 384/482; 384/486
(58) Field of Search ................................. 384/478, 482, 384/486, 135, 140

(56) References Cited

U.S. PATENT DOCUMENTS

| | | | |
|---|---|---|---|
| 4,516,783 A | 5/1985 | Mitsue et al. | |
| 4,537,519 A | 8/1985 | LaRou et al. | |
| 4,669,895 A | 6/1987 | Colanzi et al. | |
| 4,792,243 A | 12/1988 | Takeuchi et al. | |
| 4,799,808 A | 1/1989 | Otto | |
| 4,863,292 A | 9/1989 | Dreschmann et al. | |
| 4,958,942 A | 9/1990 | Shimizu et al. | |
| 5,042,822 A | 8/1991 | Dreschmann et al. | |
| 5,096,207 A | 3/1992 | Seeh et al. | |
| 5,147,139 A | 9/1992 | Lederman | |
| 5,419,642 A | 5/1995 | McLarty | |
| 5,431,413 A | 7/1995 | Hajzler | |
| 5,833,372 A | 11/1998 | Nisley | |
| 5,908,248 A | 6/1999 | Nisley | |

FOREIGN PATENT DOCUMENTS

EP    65887 A1    12/1982

*Primary Examiner*—Lenard A. Footland
(74) *Attorney, Agent, or Firm*—McDonnell Boehnen Hulbert & Berghoff

(57) ABSTRACT

A bearing assembly having a bearing inner ring with an inner raceway and a bearing outer ring with an outer raceway and a plurality of rolling elements positioned therebetween, and a seal cartridge including a seal carrier fixed with respect to the outer ring, a flinger element fixed with respect to the inner ring, and a flexible sealing member affixed to the seal carrier, wherein the flexible sealing member includes a first sealing leg in sliding contact with an inner surface of a first flange of the flinger element, a second sealing leg in sliding contact with the inner surface of the first flange of the flinger element, and a third sealing leg in sliding contact with the inwardly tapered inner surface of a second radially inwardly flange of the flinger element.

2 Claims, 2 Drawing Sheets

ROLLER BEARING HAVING HIGH PERFORMANCE BEARING SEAL AND CARTRIDGE

FIELD OF THE INVENTION

This invention is directed generally to bearing assemblies, and more particularly to roller bearings having an improved bearing seal and cartridge.

BACKGROUND

Bearing assemblies often include various components including rolling elements that are retained within the assembly to reduce friction and wear between moving parts or surfaces. A typical bearing assembly includes an inner ring that rotates relative to an outer ring of the bearing during operation and the rolling elements are positioned between the inner and outer rings. The bearing assemblies contain a lubricant that serves to protect the rolling elements from contact with either the inner or outer races of the bearing during operation. It is desirable to provide a sealing arrangement between the inner the inner and outer rings of the bearing to retain the lubricant within the bearing assembly. Such sealing arrangements are often referred to as a bearing seal cartridge. In many applications, the bearing assemblies are used in applications where the bearings are exposed to harsh operating environments where contaminants such as grit and dust are present. The sealing arrangement also serves to prevent any contaminants from entering the area where the rolling elements are positioned. Prior sealing arrangements suffer from any number of disadvantages, including complex constructions that are difficult to manufacture and costly to make and replace, providing too much or too little drag during rotation, or providing insufficient lubricant retention or contaminant exclusion. Thus, there is a need to provide a sealing arrangement, or bearing seal cartridge, that is relatively simple in construction, yet provides sufficient sealing, acceptable drag rotational drag, and sufficient lubricant retention and contaminant exclusion.

SUMMARY

The present embodiment is specifically directed to a bearing assembly having a bearing inner ring with an inner raceway and a bearing outer ring with an outer raceway and a plurality of rolling elements positioned therebetween. The present embodiment further includes a seal carrier fixed with respect to the outer ring having a flange extending generally radially inward toward the bearing inner ring. There is also a flinger element fixed with respect to the bearing inner ring that includes a first flange having an inner surface facing the outer ring and a second flange extending from the first flange in a radial direction and inwardly angled in a direction toward the outer raceway of the outer ring. Thus, the second flange is angled so as to provide a tapered inner surface. A flexible sealing member is affixed to an end of the seal carrier and has a first sealing leg contacting the inner surface of the first flange of the flinger element, a second sealing leg also contacting the inner surface of the first flange of the flinger element, and a third sealing leg contacting the tapered inner surface of the second flange of the flinger element. The distance between the flange of the seal carrier and the tapered inner surface of the second flange may be adjustable to provide more or less rotational drag as desired.

The present embodiment allows for a larger chamber area for lubricant, or grease, to be maintained between the second and third sealing legs of the flexible sealing member. In addition, the tapered second flange of the flinger element allows for a shorter, thinner axial lip on the third sealing leg, yet still provides an appropriate sealing force. This allows for a more economical overall design of the flexible sealing member. There is also more space for the radial lip design, while simultaneously reducing the gap between the flinger and the seal carrier. Thus, creating a narrower area for contaminants to enter the bearing assembly. Furthermore, the tapered second flange of the flinger helps to force contaminants up along the flinger, to provide a better flinging action.

The foregoing and other objects, features and advantages of the bearing seal cartridge will be apparent from the following more particular description of preferred embodiments as illustrated in the accompanying drawings.

DETAILED DESCRIPTION OF THE DRAWINGS

The present embodiment is illustrated in exemplary embodiments that disclose a bearing assembly having an improved bearing seal cartridge. More specifically, the exemplary embodiments have been implemented in a rolling element bearing where the rolling elements are shown as spherical balls. It should be understood that the present embodiment may be utilized on other types of bearings where a seal cartridge is desired. Therefore details regarding the bearing are provided as an example, and are not necessary to the invention unless otherwise specified.

Figure 1:
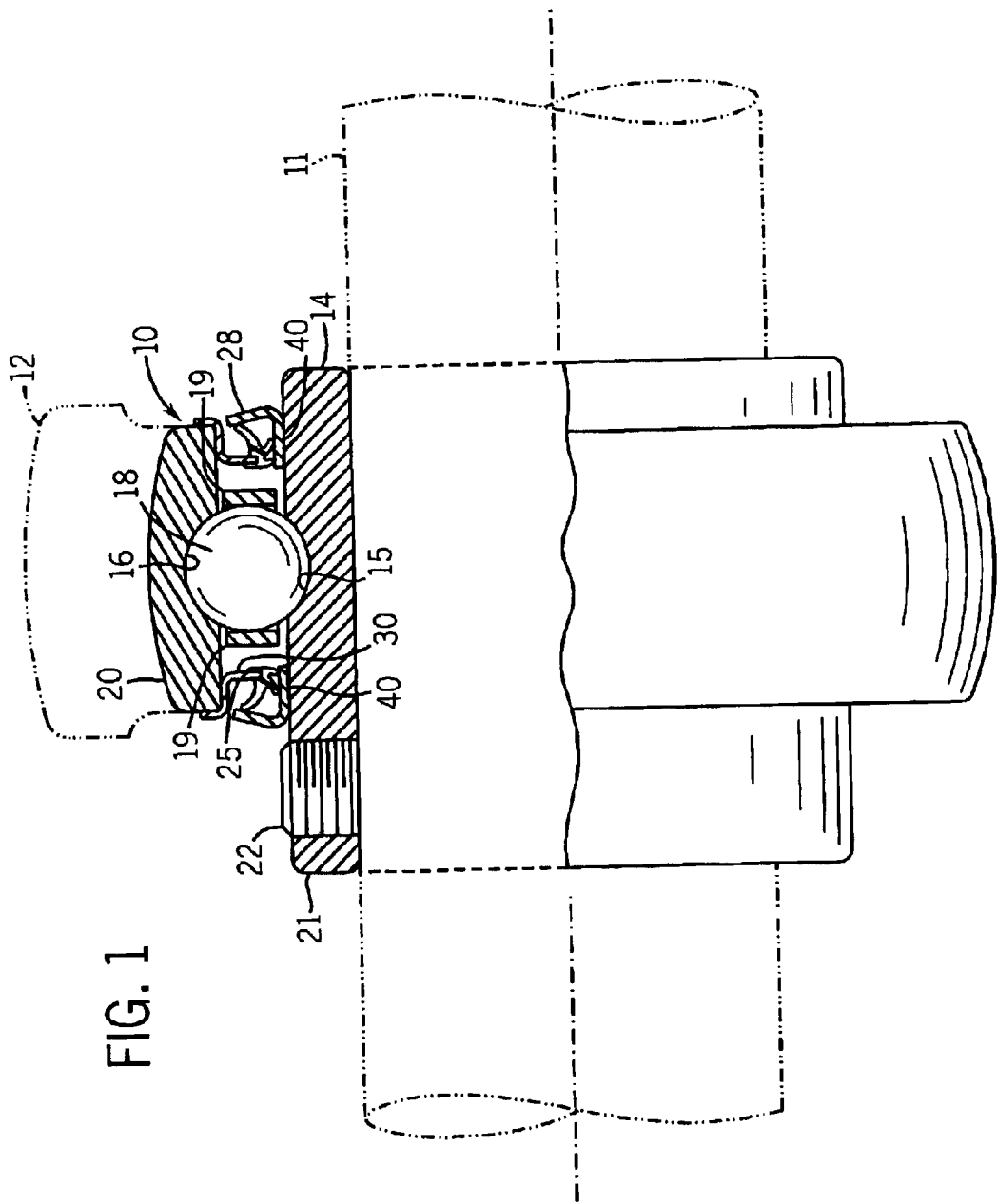
FIG. 1 is a fragmentary section of a bearing assembly of an embodiment of an embodiment of the present invention mounted on a shaft.

FIG. 1 illustrates an exemplary bearing assembly 10 showing an embodiment of the present invention mounted on a shaft 11 and retained within a conventional housing or pillow block 12. The bearing assembly 10 includes an annular inner ring 14 having an inner raceway 15 which is preferably wear hardened for extended bearing life. Surrounding the annular inner ring 14 in a spaced relation thereto is an annular outer ring 20 having an outer raceway 16 disposed in opposed relationship to the inner raceway 15. The raceways 15, 16 receive a plurality of rolling elements 18, here shown as spherical balls, in nesting relationship. The rolling elements 18 in this case are disposed in rolling element pockets of a conventional cage 19. It will be appreciated that any number of different rolling elements may be used with the bearing assembly of the present invention, including needle rollers, spherical balls and rollers, tapered rollers, and offset rollers.

The bearing assembly 10 may be affixed to a shaft 11 using any suitable means of attachment. As shown in FIG. 1, the inner ring 14 has an axial extension 21 formed with one or more threaded apertures through which setscrews 22 may be directed. The setscrews 22 may be tightened down against the shaft 11 to secure the bearing assembly to the shaft 11. Other means of attachment may also be used. For example, the inner ring may be formed with a plurality of axial finger extensions which may be compressed into secure engagement with the shaft 11 by means of a bearing locking collar, such as one of the type shown in U.S. Pat. No. 5,863,137 incorporated herein by reference.

The opposed ends of the bearing assembly 10 are sealed by using a bearing seal cartridge 25. Bearing seal cartridge may include a seal carrier 30 fixed with respect to the bearing outer ring 20, as well as a flinger element 28 fixed with respect to the bearing inner ring 14. Both the seal carrier 30 and the flinger element 28 may be formed from a stamping or the like. Preferably, both the seal carrier 30 and the flinger element 28 are formed from a stainless steel stamping. A flexible sealing member 40 is affixed to the seal carrier 30. The flexible sealing member is preferably made from fluorocarbon, most preferably VITON® available from DuPont Dow Elastomers. However, the flexible sealing member can be made from any other suitable seal material, such as nitrile, TEFLON®, VAMAC®, etc.

Figure 2:
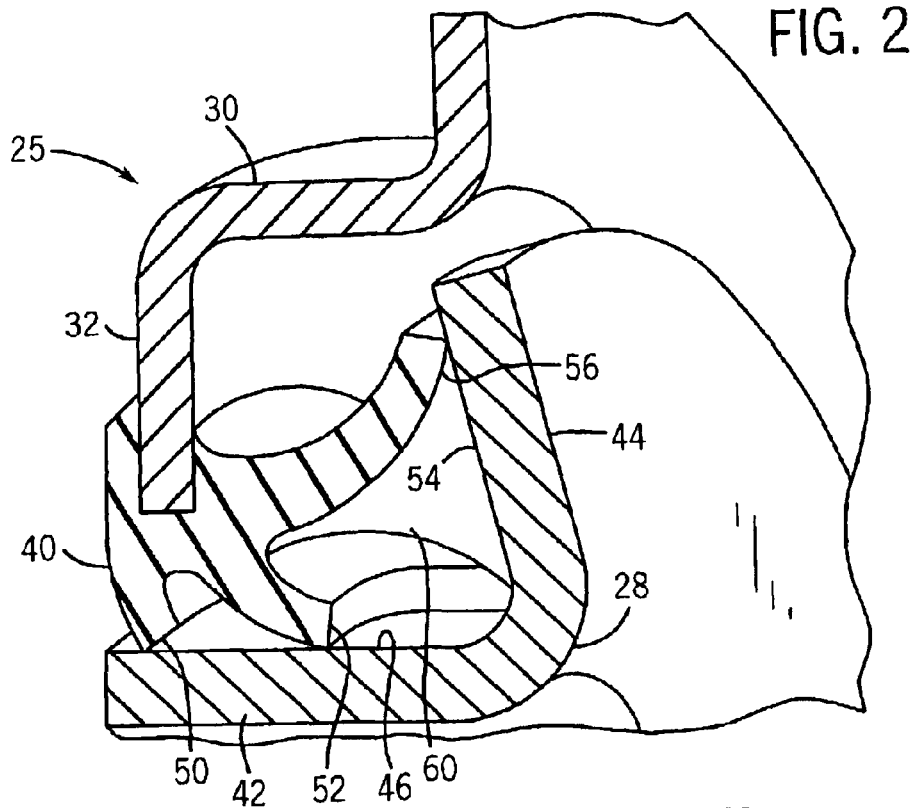
FIG. 2 is an enlarged perspective view of the bearing seal cartridge shown in FIG. 1.

Shown more clearly with reference to FIG. 2, is a perspective of the seal cartridge 25 is shown. Seal cartridge 25 includes a seal carrier 30 having a radial extending flange 32 which is adapted to carry flexible sealing member 40. Seal carrier 30 is fixed in relation to bearing outer ring 20 when placed in the bearing assembly. Seal cartridge 25 further includes a flinger element 28 that is fixed with respect to the bearing inner ring 14 when placed in the bearing assembly. Flinger element 28 includes a first flange 42 extending in an axial direction. First flange 42 includes an inner surface 46 adapted to engage first and second sealing legs 50, 52 of the flexible sealing member 40. Flinger element 28 further includes a second flange 44 extending from first flange 42 in a radial and inwardly angled direction toward the outer raceway 16 of the outer bearing ring 20. The second flange has a tapered inner surface 54 adapted to engage the third sealing leg 56 of the flexible sealing member 40. The flexible sealing member 40 is affixed to the flange 32 of the seal carrier 30. The flexible sealing member 40 includes a first sealing leg 50 that contacts the inner surface 46 of the first flange 42 of the flinger element 28, a second sealing leg that also contacts the inner surface 46 of the first flange 42 of the flinger element 28, and a third sealing leg that contacts the tapered inner surface 54 of the second flange of the flinger element 28. The geometry of the flexible sealing member and its three sealing legs provides for more lubricant, or grease, to maintained in chamber 60 between the second and third sealing legs 52, 56, and the flinger element 28, thus improving the lubrication capabilities of the bearing assembly. Moreover, the tapered flange 44 of the flinger element 28 allows for a shorter, thinner axial lip on the third sealing leg, yet still provides an appropriate sealing force. This allows for a more economical overall design of the flexible sealing member. Furthermore, the tapered second flange 44 of the flinger element helps to force contaminants up along the flinger element 28, and does not have the problems associated with corned designs that may entrap contaminants.

Figure 3:
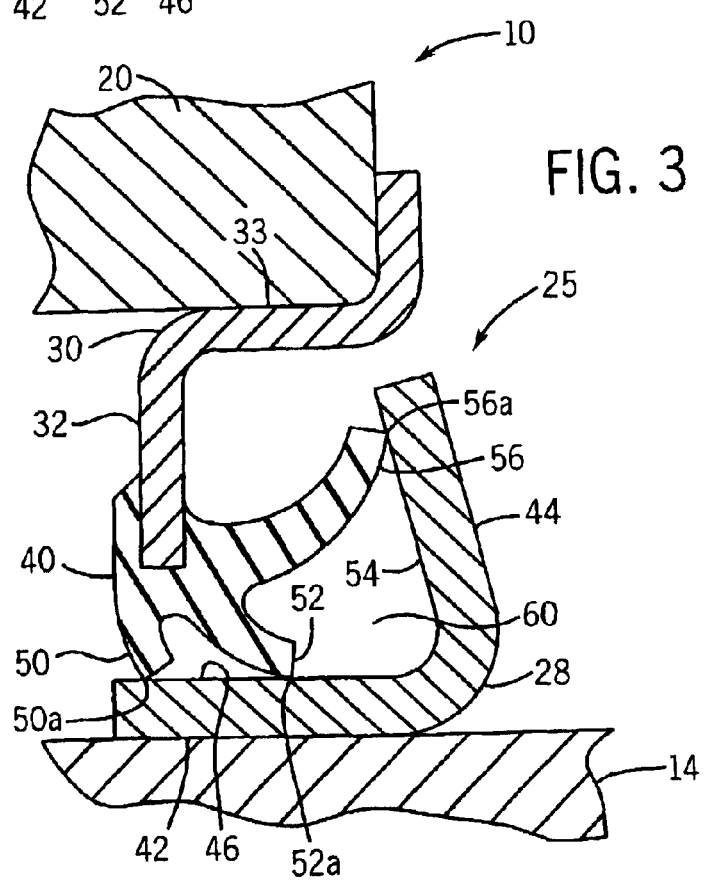
FIG. 3 is a fragmentary cross-sectional view of the bearing assembly and seal cartridge shown in FIGS. 1 and 2, respectively.

FIG. 3 shows a fragmentary cross-sectional view of the bearing assembly 10 shown in FIGS. 1 and 2. Seal cartridge 25 is shown with a seal carrier 30 having a cylindrical portion 33 that is preferably press fit within the outer ring 20 and a flange 32 extending generally radially inwardly toward the inner bearing ring 14. Seal cartridge 25 further includes a flinger element 28 having a cylindrical first flange 42 extending in an axial direction. The first flange 42 may be press fit within the inner ring 14. The first flange 42 is positioned at a location substantially adjacent the end of the flange 32 of the seal carrier 30. The flinger element 28 further includes a second flange 44 extending radially from the first flange 42 and angled inwardly toward the outer raceway of the outer ring 20. The second flange includes a tapered inner surface 54. A flexible sealing member 40 is bonded or otherwise affixed to the flange 32 of the seal carrier 30. Preferably the flexible sealing member 40 is injection molded over the flange 32 with the use of a bonding agent to ensure adhesion. However, an adhesive or any other suitable means of attachment may be used to secure the flexible sealing member 40 to the flange 32. The flexible sealing member 40 includes a first sealing leg 50 that is in sliding contact with the inner surface 46 of the first flange 42, a second sealing leg 52 that is also in sliding contact with the inner surface 46 of the first flange 42, and a third sealing leg 56 that is in sliding contact with the inner tapered surface 54 of the second flange 44 of the flinger element 28.

Each of the sealing legs 50, 52, and 56 has a pointed end 50a, 52a, and 56a respectively that contacts the inner surfaces 46, 54 of the flinger element 28. These pointed ends provide for a limited contact between the sealing legs and the flinger element at the pointed end. Therefore, the rotational drag of the sealing legs is reduced, yet the sealing legs still provide a sufficient seal against the flinger element. Prior seals suffer from having too great of an area of the sealing legs in contact with a surface of the flinger elements, undesirably increasing the rotational drag of the seals. Furthermore, each of the sealing legs is preferably configured with a geometry such that there is a biasing force pressing each of the legs against the inner surfaces of the flinger element. In this regard, the tapered inner surface 54 of the flinger element 28 serves to provide a sufficient seal with the third sealing leg 56 even after extended use. In some instances, the sealing leg will wear down over time. Because the inner surface 54 of the second flange 44 of the flinger element 28 is tapered, if the third sealing leg suffers any wear, the end of the sealing leg would simply gradually move down to a lower point (closer to the inner ring) on the inner surface 54 and still provide a sufficient seal. Thus, the tapered second flange provides for improved sealing characteristics over time. In addition, contaminants contained between the second and third sealing legs will tend to move up the flinger element more easily because of the tapered nature of the second flange 44. This improves the extirpation of any contaminants caught between the second and third sealing legs, as the contaminants more readily exit the lubricant chamber 60. Moreover, because the inner surface 54 has a straight taper, the contaminants do not become trapped against the inner surface as is the case when the inner surface does not have a straight taper.

It should be understood that the bearing assembly and seal cartridge described herein are not related or limited to any particular type of bearing, unless indicated otherwise. Various types of general purpose or specialized bearings may be used in accordance with the teachings described herein.

In view of the wide variety of embodiments to which the principles of the present embodiments can be applied, it should be understood that the illustrated embodiments are exemplary only, and should not be taken as limiting the scope of the present invention. For example, more or fewer elements may be used than shown in the drawings. Therefore, all embodiments that come within the scope and spirit of the following claims and equivalents thereto are claimed as the invention.

What is claimed is:

1. A bearing assembly comprising:

a bearing inner ring having an inner raceway on an outer surface thereof;

a bearing outer ring having an outer raceway on an inner surface thereof, said outer ring positioned such that the inner raceway is in an opposed and spaced apart relation from the outer raceway;

a plurality of rolling elements disposed between the inner raceway and the outer raceway;

a seal carrier fixed with respect to the bearing outer ring, said seal carrier including a flange extending generally radially inward toward the bearing inner ring;

a flinger element fixed with respect to the bearing inner ring, said flinger element comprised of an axially positioned first flange having an inner surface and a second flange extending from said first flange, said second flange extending in a radial and inwardly angled direction and having a tapered inner surface;

a flexible sealing member affixed to an end of the seal carrier, said sealing member having a first sealing leg contacting the inner surface of the first flange of the flinger element, a second sealing leg contacting the inner surface of the first flange of the flinger element, and a third sealing leg contacting the sloped inner surface of the second flange of the flinger element.

2. The bearing assembly of claim 1, wherein the tapered inner surface of the second flange is a straight taper.

* * * * *